Patented Jan. 14, 1947

2,414,201

UNITED STATES PATENT OFFICE 2,414,201

ISOPROPENYLVINYL ETHER

Amos Grant Horney, Euclid, and Julius George Shukys, Cleveland, Ohio, assignors to Air Reduction Company, Incorporated, New York, N. Y., a corporation of New York No Drawing. Application August 5, 1943, Serial No. 497,558

3 Claims. (Cl. 260—614)

This invention relates generally to the art of anesthesia and more particularly to a new and an improved volatile anesthetic, and to a new method of making the same.

The new compound embodying the present invention has various uses but is particularly valuable as an anesthetic for in some respects it is as good as, and in other respects it is superior to, ethyl ether and chloroform. This new compound is isopropenylvinyl ether or propethylene ether whose structural formula is

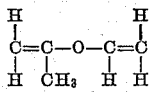

It has physical properties admirably suited for use as a volatile anesthetic. It is a colorless liquid with a characteristic ethereal odor, has a boiling point of about 55° C., a vapor pressure of 256 mm. at 25° C., a refractive index of between about 1.408 and about 1.409 and a specific gravity of 0.786 at 20° C. It is soluble in water to the extent of about 0.4 cc. per 100 cc. of water at 25° C.

This new compound, in comparison with chloroform, has a lower boiling temperature, has nearly the same potency considering the difference in density, and has more than three times the anesthetic index which is the quotient obtained by dividing the amount required to produce respiratory arrest by the amount required to produce surgical anesthesia.

In contrast with ethyl ether, this new ether has a much lower solubility in water, a much lower vapor pressure (256 vs. 532 mm.), more than twice the anesthetic index and about the same inflammability range. The anesthetic concentration in the blood under surgical anesthesia is approximately one-fifth that of ethyl ether.

Tests made on certain animals show that the new compound produced no significant histopathological changes in certain viscera and no electrocardiographic changes, and that it lowered the blood pressures. It decomposed only to a slight extent, about 1%, in the blood of those animals with the formation of acetone and acetaldehyde, neither of which is toxic in the quantities formed. It has been demonstrated that this compound can produce satisfactory surgical anesthesia in man.

The compound of this invention may be made readily and easily by dehydrohalogenating either 1-bromo-2(2-bromoethoxy) propane or 1-chloro-2(2-chloroethoxy) propane according to the following reaction:

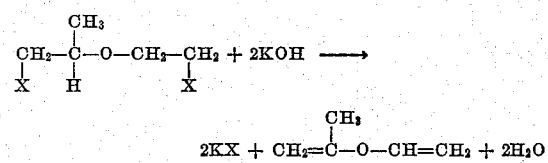

One method of accomplishing this dehydrohalogenation, which has been found to be satisfactory, is as follows: A mixture of mineral oil and potassium hydroxide was heated to about 160° C. Then a quantity of either of the foregoing propane compounds was added thereto at one time. The mixture was agitated in an atmosphere of ammonia and was gradually raised in temperature to about 250° C. The reaction product was fractionated off at a temperature below about 60° C. That crude product was washed with cold water to remove traces of ammonia, was dried and was then distilled, the desired product being the portion which distilled at temperatures of between about 54° C. and about 57° C.

Having thus described the invention so that others skilled in the art may be able to understand and practice the same, we state that what we desire to secure by Letters Patent is defined in what is claimed.

What is claimed is:

1. The method of making isopropenylvinyl ether, suitable for use as an inhalant anaesthetic, which includes the steps of mixing KOH, mineral oil and 1-halogen-2(2-halogenethoxy) propane, heating the mixture in an ammonia atmosphere at a temperature between about 150° C. and about 250° C. and collecting the resulting distillate, washing, drying and distilling the distillate and collecting the fraction thereof which distills between about 54° C. and about 57° C.

2. The method of making isopropenylvinyl ether, suitable for use as an inhalant anaesthetic, which includes the steps of mixing KOH, mineral oil and 1-bromo-2(2-bromoethoxy) propane, heating the mixture in an ammonia atmosphere at a temperature between about 150° C.

and about 250° C. and collecting the resulting distillate, washing, drying and distilling the distillate and collecting the fraction thereof which distills between about 54° C. and about 57° C.

3. The method of making isopropenylvinyl ether, suitable for use as an inhalant anaesthetic, which includes the steps of mixing KOH, mineral oil and 1-chloro-2(2-chloroethoxy) propane, heating the mixture in an ammonia atmosphere at a temperature between about 150° C. and about 250° C. and collecting the resulting distillate, washing, drying and distilling the distillate and collecting the fraction thereof which distills between about 54° C. and about 57° C.

AMOS GRANT HORNEY.
JULIUS GEORGE SHUKYS.